Jan. 10, 1956  W. MANDLER  2,730,013
REFLECTING LENS OBJECTIVE
Filed Aug. 30, 1951
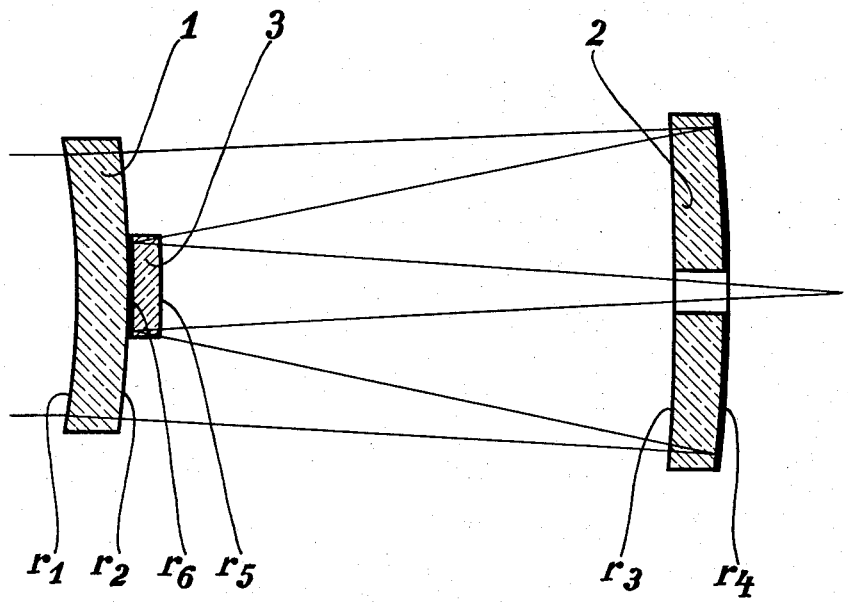
INVENTOR.
Walter Mandler

United States Patent Office 2,730,013
Patented Jan. 10, 1956

2,730,013
REFLECTING LENS OBJECTIVE

Walter Mandler, Atzbach, near Wetzlar, Germany, assignor to Ernst Leitz, G. m. b. H., a corporation of Germany Application August 30, 1951, Serial No. 244,377

Claims priority, application Germany September 2, 1950

3 Claims. (Cl. 88—57)

This invention relates to improvements in reflecting lens objectives, particularly an objective system having a long focal distance and which may be used as a telescope objective and an objective for photographic purposes.

It is known, that the optical defects of a spherical mirror may be compensated for or eliminated by means of a correction element, for example a Schmidt plate. Another correction element with spherical surfaces is disclosed in the Swiss Patent 255,151 and consists particularly of a negative meniscus having weak refractive powers, and the curved surfaces thereof have the same centers as those of the mirror. This system has an over-all length of twice the focal distance.

The German Patent 754,943 discloses an objective of the Cassegrain type in which the main mirror is a reflecting lens mirror and the collecting lens has three cemented surfaces. With such an objective it is not possible to eliminate, at the same time, the lengthwise color deviation and the chromatic differences in the focal length. Besides, a secondary spectrum remains.

The object of this invention is to provide a reflecting lens objective in which the perforated main mirror is a rear main meniscus lens with a rear reflecting surface, while the Cassegrain type second mirror is a negative lens having a reflecting surface abutting the negative front lens. Another feature of the invention is that all the lenses are made of the same kind of glass. The invention further consists in the fully calculated examples of data which by way of example are set forth in the appended claim 2.

This invention provides a system in which the over-all length is smaller than four-tenths of the focal length and which is corrected for aperture and assymetric defects as well as for the chromatic lengthwise deviation and focal differences. The system is without secondary spectrum because only one kind of glass is used.

By forming both mirrors as reflecting lenses, the system includes the advantage that known elements of correction may be utilized. The design with the greatest possible distance between the second mirror and the main mirror gives a small over-all length of the system.

The accompanying drawing figure is a diagram illustrating an objective embodying the invention. The front negative lens is marked 1 and is followed by a second Cassegrain type dispensing negative lens 3 cemented to the front lens 1 and having a reflecting surface abutting the front lens at the radius $r_5$. The main mirror is shown at 2 and is provided with a central aperture as shown and a rear reflecting surface at the radius $r_4$. The several elements shown in the drawing are characterized by the following values, namely that $r$=the radius
$d$=thickness of lens
$r$ to $r$=distance between lenses
$n$=refractive index
$f$=focal length of system The aperture proportion and the over all length are also set forth. The example illustrated is that of a reflecting lens objective embodying the invention in which the several elements are characterized by the following values:

| | Thicknesses | Distances |
|---|---|---|
| $r_1=-$ 249.2 | | |
| | Lens 1, $d=19.9$ | $r_2$ to $r_6=0$ |
| $r_2=-$ 413.9 | | |
| $r_3=-1,309.6$ | | |
| | Mirror 2, $d=19.9$ | |
| $r_4=-$ 646.45 (reflecting) | | $r_5$ to $r_3=203.9$ |
| $r_5=+1,626.5$ | | |
| | Mirror 3, $d=11.6$ | |
| $r_6=-$ 363.1 (reflecting) | | |

Refractive index $n=1.514/64$
Focal length $f=880$ mm.
$r$ to $r$=distance between lenses
Aperture proportion 1:9.5
Over-all length 330 mm.

I claim:
1. A reflecting lens objective of the Cassegrain type comprising in operative alignment a front negative lens, a second dispersing Cassegrain type negative lens cemented to said front lens with a reflecting surface between the said two lenses and a rear main maniscus lens having a central aperture and a reflecting surface on its rear side and axially air spaced from the said front negative lens, all of the said lenses being made of the same kind of glass.

2. A reflecting lens objective according to claim 1 characterized by that the over all length is less than four tenths of the focal length of said objective.

3. A reflecting lens objective of the Cassegrain type including a front negative lens characterized by that the apertured main mirror is a meniscus with a rear reflecting surface; that the second mirror is a negative lens having a reflecting surface abutting the negative lens in front thereof; that all the lenses are made of the same kind of glass characterized by the following data:

| | Thicknesses | Distances |
|---|---|---|
| $r_1=-$ 249.2 | | |
| | Negative Lens 1, $d=19.9$ | $r_2$ to $r_6=0$ |
| $r_2=-$ 413.9 | | |
| $r_3=-1,309.6$ | | |
| | Main Mirror 2, $d=19.9$ | |
| $r_4=-$ 646.45 (reflecting) | | $r_5$ to $r_3=203.9$ |
| $r_5=+1,626.5$ | | |
| | Second Mirror 3, $d=11.6$ | |
| $r_6=-$ 363.1 (reflecting) | | |

$r$=radius
$d$=thickness of lens
$r$ to $r$=distance between lenses
Refractive index—$n=1.514/64$
Focal length—$f=880$ mm.
Aperture proportion 1:9.5
Over-all length 330 mm.

References Cited in the file of this patent

UNITED STATES PATENTS

| 2,378,301 | Kaprelian | June 12, 1945 |
| 2,403,660 | Hayward | July 9, 1946 |
| 2,504,383 | Bouwers | Apr. 18, 1950 |
| 2,520,635 | Grey | Aug. 29, 1950 |
| 2,563,433 | Taylor | Aug. 7, 1951 |

FOREIGN PATENTS

| 544,694 | Great Britain | Apr. 23, 1942 |
| 724,026 | Germany | Aug. 15, 1942 |
| 255,151 | Switzerland | Feb. 1, 1949 |
| 969,797 | France | May 31, 1950 |